United States Patent

[11] 3,621,351

[72] Inventors Tatsuo Goto
Hachioji-shi;
Yoryo Matsudo, Chiba-shi; Hiroshi
Watanabe, Hitachi-shi, all of Japan
[21] Appl. No. 755,964
[22] Filed Aug. 28, 1968
[45] Patented Nov. 16, 1971
[73] Assignee Hitachi Ltd.
Tokyo, Japan
[32] Priority Sept. 1, 1967
[33] Japan
[31] 42/55748

[54] CONTROLLED INDUCTION MOTOR DEVICE
9 Claims, 9 Drawing Figs.
[52] U.S. Cl. .................................................. 318/227,
310/46
[51] Int. Cl. ................................................... H02p 5/40
[50] Field of Search ........................................ 318/227;
310/44, 46

[56] References Cited
UNITED STATES PATENTS
2,101,665 12/1937 Arey et al. ..................... 310/44 X
2,125,970 8/1938 Waters .......................... 310/44 X
3,332,008 7/1967 Mueller et al. ................ 318/227 X Primary Examiner—Gene Z. Rubinson
Attorney—Craig, Antonelli, Stewart & Hill ABSTRACT: A controlled induction motor device employs a three-phase induction motor whose rotor has a rotor winding of a relatively large resistance to reduce the electrical time constant of the rotor to be equal to or less than the reciprocal of the frequency of the three-phase AC power which is supplied to the motor. A controllable rectifier is inserted in one of the three-phase AC power lines supplying power to the motor in order to intermittently supply the three-phase power to the motor, whereby the motor can be rotated at low speeds without vibration.

CONTROLLED INDUCTION MOTOR DEVICE

BACKGROUND OF THE INVENTION

This invention relates to a controlled induction motor device, and more particularly it pertains to a novel and improved low-speed controlled electric motor device which is capable of being controlled continuously in a wide range of speed, i.e. from a high speed to a very low speed and vice versa and capable of being driven without vibration.

DC motors or step motors have conventionally been employed for speed control at 100 r.p.m. or below. Disadvantageously, however, such motors per se are expensive, and furthermore the control devices therefor are complicated in construction and accordingly are expensive. Furthermore, difficulties have been encountered in the production of a high capacity step motor, and the DC motors require a great amount of maintenance. This has constituted a bottleneck in the related field of art.

SUMMARY OF THE INVENTION

A primary object of the present invention is to provide a controlled induction motor device which is substantially free from the foregoing drawbacks.

Another object of the present invention is to provide a novel controlled induction motor device, wherein a three-phase induction motor with a relatively small electric time constant in its rotor is employed and intermittently supplied with three-phase AC power through a controllable rectifier so that a wide-range speed control can be provided at low speeds while maintaining a relatively low temperature increase and reduced vibration. The apparatus of the present invention comprises in combination, a three-phase induction motor whose rotor has its electric time constant equal to or less than about the reciprocal ($1/f$) of the frequency $f$ of a power source, and at least one controllable rectifier capable of rectifying action connected in series to at least one of the three-phase stator windings of said motor, so that said motor is controlled by a driving current produced through the action of said controllable rectifier wherein said current has three-phase alternate current sections and pulsating direct current sections.

DESCRIPTION OF THE PREFERRED EMBODIMENTS OF THE INVENTION

The inventor has already proposed a method for driving a motor in a low-speed range of 0.1 r.p.m. to a few hundred r.p.m. by the use of a combination of a rigid and inexpensive three-phase squirrel-cage induction motor and a driving circuit using controlled rectifier elements as discussed in Japanese Pat. No. 518,186-B.

The three-phase induction motor is suited to high-speed operation and can be easily constructed so as to have an increased capacity. Thus, the aforementioned bottleneck can be overcome by the foregoing method.

Figure 1:
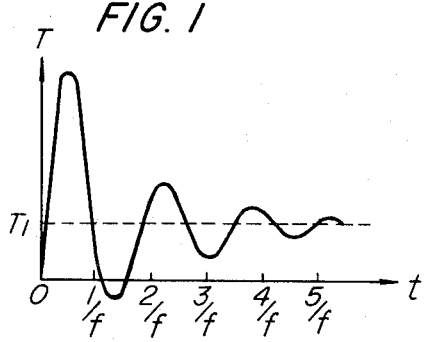
FIG. 1 is a view useful for explaining the transient torque of a three-phase induction motor.

Description will first be made of such driving method. When three-phase power is continuously supplied to a three-phase induction motor in a locked state, a transient torque is generated with respect to time $t$ as marked by reciprocals of the cycle $f$ of the applied power, wherein an extremely high peak torque value occurs during the first cycle, i.e., $1/f$ second and thereafter it converges to a driving torque $T_1$ while oscillating, as shown in FIG. 1. Thus, by limiting the duration of application of AC three-phase power to only one-half or one full cycle, it is possible to generate a pulse-like torque which has only one peak corresponding to the first peak of the above-mentioned transient torque. As a result, a 50 c.p.s. three-phase induction motor, for example, is driven in a stepped manner by a pulselike torque having a width of about 10 milliseconds.

Figure 2:
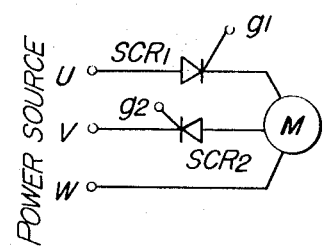
FIG. 2 is a diagram showing a driving circuit for the three-phase induction motor.

FIG. 2 is a view showing an arrangement adapted for performing such an operation, wherein $SCR_1$ and $SCR_2$ represent silicon-controlled rectifiers, respectively, M is a three-phase induction motor and U, V and W are terminals of a three-phase power source, respectively. With a squirrel-cage induction motor, if there were not provided any variable control in the driving circuit of FIG. 2, then noncontrollable ordinary rectifiers were replaced for the controlled rectifiers to conduct power during only a half cycle the peak value of torque generated by the motor would be several times as high as the rated torque of the motor.

Figure 3:
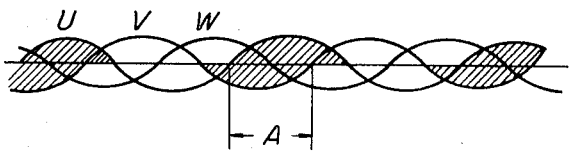
FIGS. 3 and 4 are views useful for explaining the operation of the driving circuit.
Figure 4:
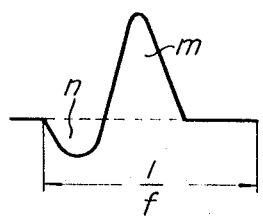

In the driving circuit of FIG. 2, the two silicon-controlled rectifiers are intermittently fired at the interval of $1/f$ seconds to render the U and V phases conductive for the periods indicated by the oblique lines as shown in FIG. 3 so that the motor is driven by a torque which occurs during the period or section A when all the three phases are concurrently in the conductive state. If intermittent application of power to the motor is repeated, then the torque generated at the first firing becomes different in waveform from the torques generated at the second and subsequent firings. That is, the secondary and subsequent torques have alternately appearing negative torque $n$ and a positive torque $m$, as shown in FIG. 4, and the peak thereof is gradually increased to finally become about 10 times as high as the rated torque. The inventor has analyzed this phenomenon both theoretically and experimentally and proved that it is due to a residual electric current in the rotor. In the drive by the first firing, only a positive pulselike torque is generated since no current flow is present in the rotor, but at the second and subsequent firings, there is a residual current flow in the rotor caused by the previous firing. More specifically, at the initial stage in a cycle period, the magnetic flux resulting from such residual current acts in the opposite direction to the direction of rotation of a magnetic field resulting from the excitation of the stator, thus resulting in the negative torque $n$. Subsequently, the positive torque $m$ is produced which is directed in the direction of rotation depending upon the excitation of the stator. Thus one cycle is completed. With a universal or conventially used induction motor, the electric time constant of the rotor winding is so high than an increased residual current flows therethrough, thus resulting in a considerably great negative torque $n$. In this way, the motor is driven with vibration at a very low speed by a torque corresponding to the difference between said positive and negative torques $m$ and $n$.

It will thus be appreciated that in accordance with the aforementioned method, a very low operational speed can be attained by a very simple circuit arrangement, and also that speed control can be achieved by controlling the conduction angles of the silicon-controlled rectifiers.

Disadvantageously, however, a great amount of vibration tends to occur due to the negative torque. Thus, the foregoing method has such drawbacks that the speed range cannot be made sufficiently wide, the temperature of the stator winding is greatly increased due to repetition of the transient phenomenon occurring at the starting stage, and it possibly occurs that a high-speed rotation tends to be caused when the motor is switched from high-speed operation to low-speed operation due to the fact that two stable points are present on the torque characteristic curve.

In view of the foregoing, the present invention has been made. In accordance with the present invention, use is made of such a special induction motor that the residual current of the rotor is quickly attenuated to minimize vibration so that the residual current is negligibly small when the subsequent driving cycle is initiated. In other words, the present invention is characterized by the use of an induction motor in which the rotor thereof has a small electric time constant.

The time constant $t$ is given approximately by $$t = (M + L_2)/R_2 \text{ (seconds)}$$

where $M$: mutual inductance between the stator and rotor windings $L_2$: leakage inductance of the rotor winding $R_2$: resistance of the rotor winding Generally, in a universal induction motor, the time constant $t$ is of the order of 100 milliseconds. The drive interval in the driving method as mentioned above is of the order of 10 milliseconds (when use is made of 50 or 60 c.p.s. power source). Thus, the time constant of the rotor is too large as compared with the drive interval, and this has been the cause for the aforementioned vibration. Therefore, in accordance with the present invention, the time constant $t$ is decreased to $1/f$ or less, where $f$ represents the frequency of the power source. In order to accomplish the principle of the present invention, it is conceivable to increase the resistance of the rotor winding or to reduce the sum of the mutual inductance between the stator and rotor windings and the leakage inductance of the rotor winding.

Figure 5:
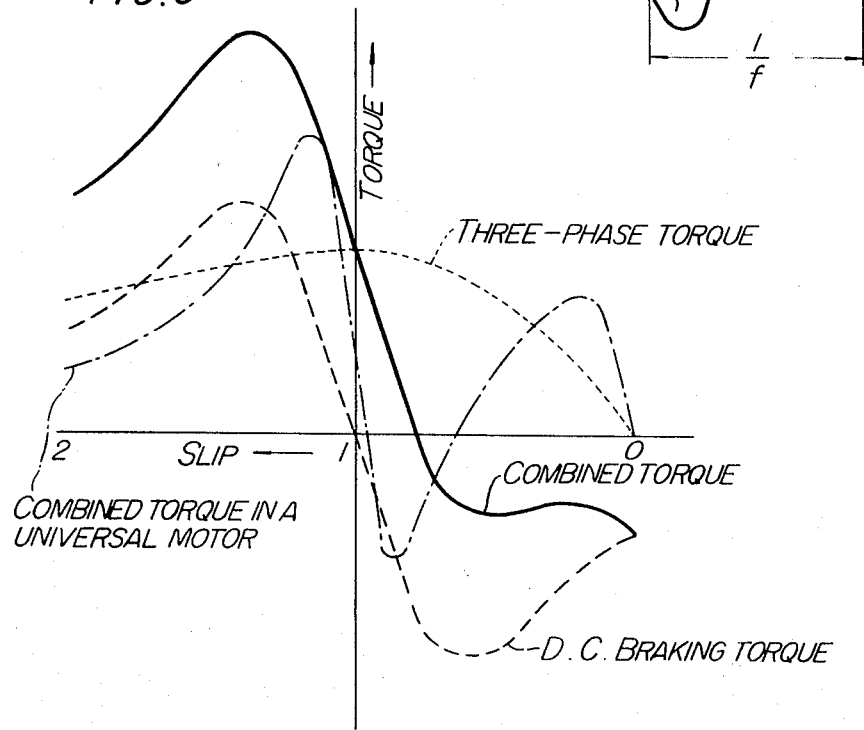
FIGS. 5, 6 and 7 are views useful for explaining embodiments of the present invention.
Figure 6:
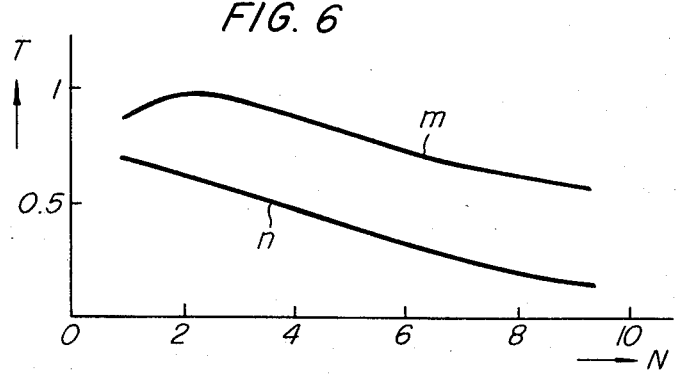

The present invention will now be described in greater detail with reference to the drawings. FIG. 6 illustrates the peak values of a positive torque $m$ and a negative torque $n$, similar to those of FIG. 4, which are produced by operating the driving circuit of FIG. 2 in such a manner as shown in FIG. 3 by changing the rotor resistance (the rated rotor resistance: $3\Omega$) of a universal induction motor, wherein the ordinate indicates torque T, and the abscissa shows ratio N of the changed rotor resistance to the rated resistance. The negative torque is substantially large in magnitude comparable to the positive torque when the ratio N is equal to one, i.e. the rotor resistance is equal to the rated resistance thereof; but such negative torque can be substantially eliminated by increasing the rotor resistance $R_2$ by about 10 times. This is because the time constant of the rotor which was previously of the order of 100 milliseconds is reduced to the order of 10 milliseconds by increasing the rotor resistance by about 10 times, and the residual current of the rotor has substantially no effect on the driving operation even if such operation is performed at every cycle, since the residual current has been substantially attenuated. In fact, vibration can be eliminated using, for example, an alloy (copper 62 percent, nickel 18 percent, zinc 20 percent) having a resistivity about 12 times as high as that of copper as the conductor material for the squirrel-cage rotor. And yet, the speed changing range, which has been variable to 100 r.p.m. or below at best with the universal motor, can be expanded up to about 200 r.p.m. Furthermore, the increased rotor resistance results in a reduction by half of the current flowing through the rotor, thus decreasing the rotor temperature rise. At his point, the torque characteristic curve is represented by the sum of the positive torque occurring for the three-phase A and the DC braking torque occurring for the single-phase period, as shown in FIG 5, and only a single stable point appears at a relatively low-speed position. With the universal induction motor, however, the peak of the three-phase torque occurs in the neighborhood of zero slip so that the combined torque also assumes a peak at that position and thus two stable points occur. This leads to the possibility that problems arise when an attempt is made to perform the running operation by switching the motor from a high-speed to a low-speed operation. In accordance with the present invention, the stable point is eliminated at the higher speed position, so that the lower speed stable point is reached immediately after switching is effected from a high speed to a low speed. Furthermore, it is possible to cause a negative torque to occur in the high-speed region by suitably selecting the resistance of the rotor, thus resulting in an improved response in the switching operation. In case it is desired that the motor operating at a high speed be stopped, the time required for stopping the same can be shortened by once switching the motor to a low speed and then cutting off the power source, as compared with the case where the power source is directly cut off.

Figure 7:
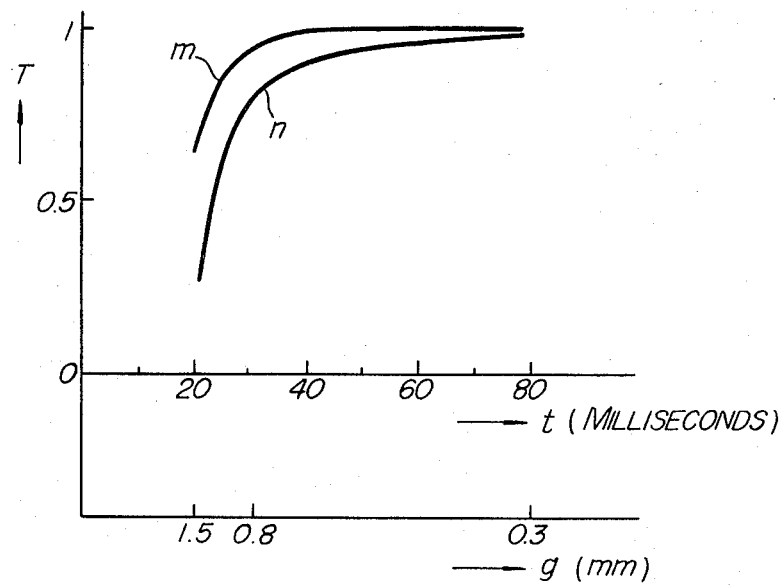
Figure 8:
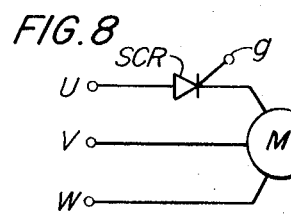
FIGS. 8 and 9 show other forms of driving circuits for the three-phase induction motor.
Figure 9:
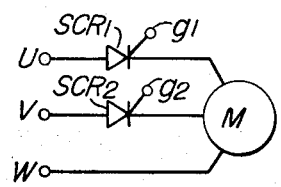

In the foregoing, description has been given of the case where the rotor resistance is increased to decrease the time constant of the rotor winding. However, it is also possible to decrease the time constant by decreasing either the mutual inductance between the stator and rotor windings or the leakage inductance of the rotor winding. FIG. 7 shows how the peak values of the positive and negative torques are varied by changing the length of the gap $g$ between the rotor and the stator of the motor. From this, it will be seen that the magnitude of the negative torque can be greatly reduced and concomitantly the vibration can be decreased by reducing the time constant $t$ to about 20 milliseconds by making the gap length as great as 1.5 mm. in contrast to the case of a universal induction motor wherein such gap length is as small as 0.3 mm. As described above, by reducing the electric time constant of the rotor to about $1/f$, the vibration can be decreased, and the effective torque corresponding to the difference between the positive and negative torques can be increased so that the speed variable range can be accordingly widened. In the driving circuit, a single silicon-controlled rectifier may be inserted only in one phase line of three-phase lines, as shown in FIG. 8. Alternatively, use may be made of such a driving circuit as shown in FIG. 9, whereby similar low-speed driving can also be achieved. It should be noted here that a variety of modifications will become possible with respect to the means for decreasing the electric time constant of the rotor.

It will be readily apparent that use may be made of a wound rotor induction motor which is provided with the aforementioned characteristics by changing the secondary resistance thereof or by using an annular core for the rotor core, without departing from the principle of the present invention.

As described above, in accordance with the present invention, a wide-range speed control can be achieved by a combination of an inexpensive electric motor and a simple driving circuit, and vibration and temperature rise can be minimized to great advantage.

We claim:

1. A controlled induction motor apparatus comprising:

a three-phase induction motor having a rotatable rotor and rotor and stator windings, the rotor of said motor having a reduced electric time constant $t$ which is defined by $t=(M+L_2)/R_2$, where $M$ is the mutual inductance between the stator and the rotor windings of said motor, $L_2$ is the leakage inductance of the rotor winding and $R_2$ is the resistance of the rotor winding, said time constant being determined to be no greater than the reciprocal of the frequency of a three-phase AC power applied to the motor;

three-phase AC power lines connected to said induction motor for supplying said three-phase AC power thereto; and at least one controllable rectifier connected in one of the three-phase lines and rendered conductive for a time period shorter than a half cycle of the three-phase AC power so as to provide a three-phase period shorter than the half cycle period and a single-phase period in each cycle of the AC power, whereby said induction motor is rotated at a low speed by a combined torque comprising a three-phase torque due to the three-phase period and a DC breaking torque due to the single phase period which is substantially eliminated by the reduction of the time constant, so that a wide range speed control at low speeds is provided without a significant temperature rise and while reducing vibrations in the motor.

2. A controlled induction motor apparatus as defined in claim 1, wherein the resistance of the rotor winding of said induction motor is so large as to render said time constant to be not greater than the reciprocal of the frequency of the three-phase AC power.

3. A controlled induction motor apparatus as defined in claim 1, wherein the mutual inductance between the stator and the rotor windings of said induction motor is so small as to render the time constant of said induction motor to be not in excess of the reciprocal of the frequency of the three-phase AC power.

4. A controlled induction motor apparatus according to claim 1, wherein the conductor material of which said rotor is wound comprises an alloy having a resistivity approximately 12 times as great as the resistivity of copper.

5. A controlled induction apparatus according to claim 4, wherein said alloy consists of 62% Cu, 18% Ni and 20% Zn.

6. A method for substantially eliminating vibration and reducing the temperature rise in a controlled induction motor apparatus having a three-phase induction motor employing a rotatable rotor, which has a time constant defined by $t=(M+L_2)/R_2$, where $M$ is the mutual inductance between the stator and rotor windings of the induction motor, $L_2$ is the leakage inductance of the rotor winding and $R_2$ is the resistance of the rotor winding, three-phase AC power lines connected to said induction motor for supplying three-phase AC power and at least one controllable rectifier connected in one of said three-phase lines and rendered conductive for a period of time shorter than the half cycles of the three-phase AC power, so as to provide a three-phase period and a single-phase period in each cycle of the AC power, whereby said induction motor is rotated at a relatively low speed by a combined torque comprising a three-phase torque due to the three-phase period and a DC breaking torque due to the single-phase period, comprising the step of:

reducing said electric time constant of the rotor of said induction motor to be no greater than the reciprocal of the frequency of said three-phase AC power.

7. A method as defined in claim 6, wherein said step of reducing comprises the step of increasing the resistance of said rotor winding, whereby said time constant is not in excess of the reciprocal of the frequency of the three-phase AC power.

8. A method as defined in claim 6, wherein the step of reducing comprises the step of decreasing the mutual inductance between the stator and the rotor windings, whereby said time constant is not in excess of the reciprocal of the frequency of the three-phase AC power.

9. A method according to claim 8, wherein the step of decreasing the mutual inductance includes increasing the gap between the rotor and the stator windings of the motor.

* * * * *